Jan. 13, 1942.  J. C. COWIE  2,269,756
CENTERING GUIDE PIN FOR DIESTOCKS
Filed Sept. 23, 1940

INVENTOR
J. C. COWIE.
BY
ATTORNEYS

Patented Jan. 13, 1942

2,269,756

UNITED STATES PATENT OFFICE 2,269,756

CENTERING GUIDE PIN FOR DIESTOCKS

James Campbell Cowie, Liverpool, Nova Scotia, Canada

Application September 23, 1940, Serial No. 357,850

1 Claim. (Cl. 10—107)

My invention relates to improvements in centering guide pins for die stocks and the object of the invention is to divise a pin which may be adjusted to engage the internal surface of a pipe or nipple end the internal diameter of which has changed through wear or depreciation due to age and it consists essentially of the arrangement and construction of parts as hereinafter described.

In the drawing like characters of reference indicate corresponding parts in each figure.

Figure 1:
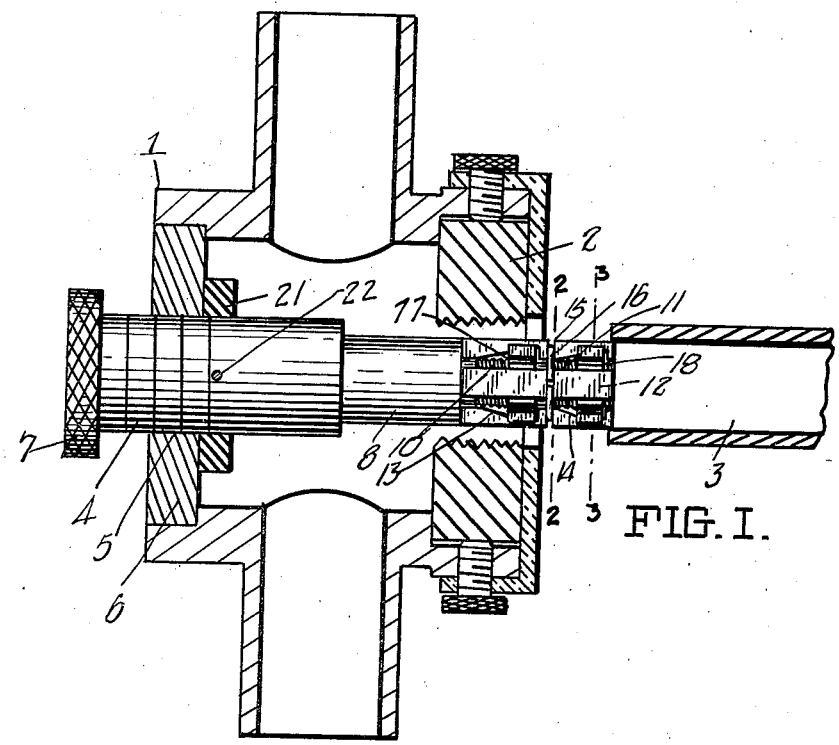
Fig. 1 is a sectional view through a die stock and pipe shown in section and my centering pin applied thereto and shown in full.
Figure 4:
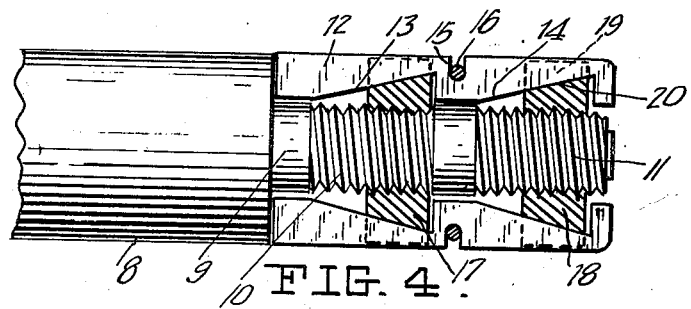
Fig. 4 is an enlarged view of the expandible end of the centering pin showing parts in section.
Figures 2, 5:
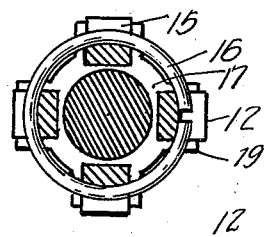
Fig. 2 is a cross sectional view on line 2—2 Fig. 1.
Fig. 5 is a perspective detail of one of the bars engaging the internal surface of the pipe or nipple wall.
Figure 3:
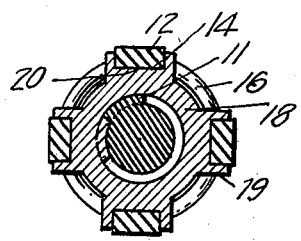
Fig. 3 is a cross sectional view on line 3—3 Fig. 1.

1 is a die stock of any common construction reversely set, that is with the threading dies 2 on that side of the stock which is adjacent to the end of the pipe 3 to be threaded. 4 is the main cylindrical body of the centering pin guideably held in the orifice 5 of the bushing 6 forming part of the stock. The body 4 corresponds in diameter to the external diameter of the pipe to be threaded.

The outer end of the body 4 is provided with a knurled head 7 and the inner end with a reduced cylindrical portion 8 corresponding in diameter to the internal diameter of the pipe to be threaded. Extending centrally from the inner end of the portion 8 is a further reduced portion 9 in which are formed the threaded sections 10 and 11.

12 are gripping bars each having inclined internal cam faces 13 and 14 opposite the threaded sections 10 and 11 and a central transverse groove 15 through which the split securing ring 16 extends to resiliently bind the bars 12 together. 17 and 18 are nuts engaging the threaded sections 10 and 11 and provided with radial jaws 19 having inclined bottom faces 20 corresponding to and engaging the faces 13 and 14.

Before the expandible end of the centering pin is inserted in the pipe 3 and in the die stock the head 7 is manually turned, the other hand holding the bars 12 and nuts 17 and 18 from rotation. By this means the nuts 17 and 18 are screwed to move longitudinally in a leftwise direction, the contacting inclined surfaces 13 and 14 of the bars and 20 of the nuts forcing the bars outward against the tension of the split ring 16 to the internal diameter of the pipe 3 into which the adjuster pin is slipped to form a guide for the dies and stock as the external thread is cut in the pipe 3.

In cases where the pipe to be threaded depends vertically I support the centering pin by an annular disc 21 secured around the cylindrical body 4 by a pin 22 so as to rest on the bushing 6.

The centering pin can also be used as a nipple holder for threading nipples. The nipple holder need not be reversible and it can also be used on power pipe machines as a nipple holder.

What I claim as my invention is:

An independent centering pin adaptable for use in any standard die stock and comprising a closure for the side of the stock remote from the dies and having an orifice in axial alignment with a point centered between the cutting ends of the dies, a centering pin body fitting the orifice having a knurled enlargement at its outer end and a reduced extension at its inner end forming an intermediate pin portion, a further extension having an exterior thread, a pair of spaced apart nuts screwed on the thread and having diametrically opposite notches formed therein in longitudinal alignment, and having parallelly inclined bottoms, gripping bars fitting the notches and having inclined surfaces engaging each inclined surface of the nuts and of greater length than the width of the nuts, and yieldable means for holding the inclined surfaces of the nuts and bars in engagement.

JAMES CAMPBELL COWIE.